(12) United States Patent
Neiser et al.

(10) Patent No.: US 9,199,802 B2
(45) Date of Patent: Dec. 1, 2015

(54) ACCUMULATION CONTROL

(71) Applicant: Intelligrated Headquarters, LLC, Mason, OH (US)

(72) Inventors: Raymond R. Neiser, Batavia, OH (US); Jason A. Johnson, Hamilton, OH (US); Brian J. Resnick, Cincinnati, OH (US); Christopher S. Anderson, West Harrison, IN (US); Kevin L. Klueber, Indian Springs, OH (US); Jeffrey S. Turner, Reading, OH (US); Matthew S. Wicks, Saint Charles, MO (US)

(*) Notice: Subject to any disclaimer, the term of this patent is extended or adjusted under 35 U.S.C. 154(b) by 0 days.

(21) Appl. No.: 14/093,454

(22) Filed: Nov. 30, 2013

(65) Prior Publication Data

US 2014/0156061 A1 Jun. 5, 2014

Related U.S. Application Data

(60) Provisional application No. 61/732,235, filed on Nov. 30, 2012.

(51) Int. Cl.
*G06F 7/00* (2006.01)
*B65G 47/26* (2006.01)
*B65G 43/10* (2006.01)

(52) U.S. Cl.
CPC ............ *B65G 47/268* (2013.01); *B65G 43/10* (2013.01)

(58) Field of Classification Search
CPC .. B65G 43/10; B65G 2203/044; B65G 37/02; B65G 47/52; B65G 47/82; B65G 47/261
See application file for complete search history.

(56) References Cited

U.S. PATENT DOCUMENTS

| | | | |
|---|---|---|---|
| 5,228,558 A * | 7/1993 | Hall | 198/784 |
| 5,823,319 A | 10/1998 | Resnick et al. | |
| 6,668,775 B2 | 12/2003 | Harris | |
| 6,889,822 B1 | 5/2005 | Wagner et al. | |
| 7,360,638 B2 | 4/2008 | Ko et al. | |
| 7,730,861 B2 | 6/2010 | Ng | |
| 8,056,523 B2 | 11/2011 | Ha et al. | |
| 8,267,059 B2 | 9/2012 | Manther et al. | |
| 8,312,851 B2 | 11/2012 | Heinemann | |
| 8,726,862 B2 | 5/2014 | Zurface et al. | |
| 2002/0063037 A1 * | 5/2002 | Bruun et al. | 198/370.01 |
| 2006/0289275 A1 * | 12/2006 | Lemke et al. | 198/460.2 |
| 2011/0067977 A1 | 3/2011 | Neiser | |

FOREIGN PATENT DOCUMENTS

| | | |
|---|---|---|
| EP | 2522602 | 11/2012 |
| JP | 09-002647 | 1/1997 |

OTHER PUBLICATIONS

International Search Report and Written Opinion dated Mar. 5, 2014 for Application No. PCT/US2013/072532.
English Abstract of Japanese Patent JP 09-002647.
U.S. Appl. No. 61/754,969, filed Jan. 21, 2013.
U.S. Appl. No. 61/754,971, filed Jan. 22, 2013.
International Search Report dated Oct. 13, 2014 for Application No. PCT/US2014/012755.

* cited by examiner

*Primary Examiner* — Yolanda Cumbess

(57) ABSTRACT

Zones of an accumulation conveyor are controlled using a look ahead approach. The speed and article presence conditions of downstream and upstream zones are used to assess the condition of article flow in the neighborhood of a particular zone. The respective speeds of individual zones are then selected and implemented based on the assessment.

24 Claims, 8 Drawing Sheets

ACCUMULATION CONTROL

CROSS-REFERENCE TO RELATED APPLICATIONS

This is a non-provisional of, and claims the benefit of, U.S. provisional patent application No. 61/732,235, filed on Nov. 30, 2012; U.S. provisional patent application No. 61/754,969, filed on Jan. 21, 2013; and U.S. provisional patent application No. 61/754,971, filed on Jan. 22, 2013. The disclosures of each of those applications are hereby incorporated by reference in their entireties.

BACKGROUND

The present disclosure relates generally to material handling systems, and is more particularly directed to a system which provides efficient accumulation of articles. The innovation will be disclosed in connection with, but not necessarily limited to, accumulation conveyors with control systems which selectively set zone speeds based on conditions of upstream and downstream zones.

In material handling systems, accumulation of articles into groups, often called slugs or trains, reduces delays in material handling by temporarily stopping or holding, articles and then releasing them in coordination with other subsystems of the material handling system, including for example, other accumulators. Improvements in efficiency of an accumulation system improves the material handling performance by improved accuracy and throughput.

BRIEF DESCRIPTION OF THE DRAWINGS

The accompanying drawings together with specification, including the detailed description which follows, serve to explain the principles of the present invention.

Figure 1:
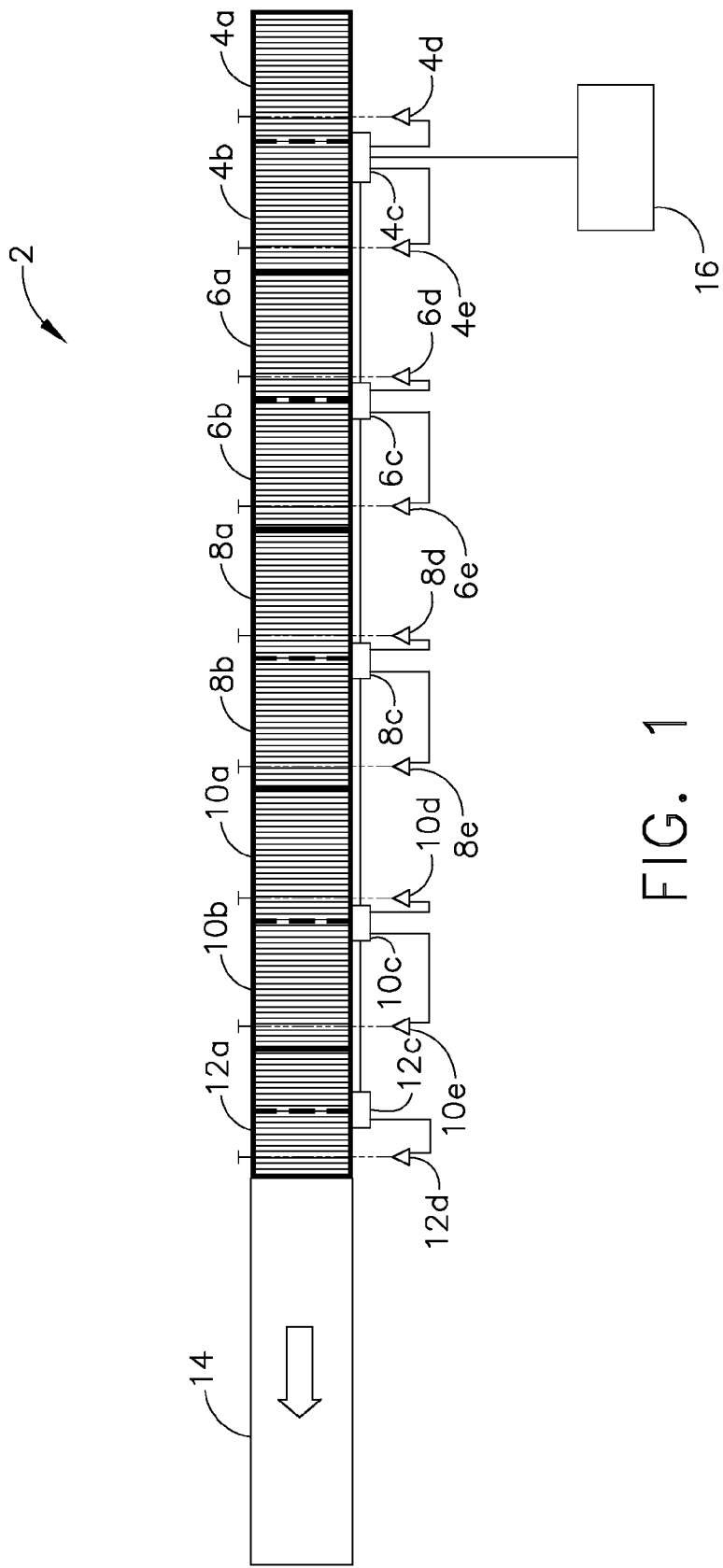
FIG. 1 illustrates a diagrammatic plan view of an accumulation conveyor, according to one embodiment.

Reference will now be made in detail to one or more embodiments illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

U.S. patent application Ser. No. 12/727,634, filed on Mar. 19, 2010 for Zoned Accumulation Conveyor is hereby incorporated in its entirety by reference. Referring to FIG. 1, there is shown a diagrammatic plan view of an accumulation conveyor embodying one or more teachings of the present disclosure. Accumulation conveyor, generally indicated at 2, includes a plurality of zones 4a, 4b, 6a, 6b, 8a, 8b, 10a, 10b and 12a, which are individually controllable. Although in the embodiment depicted in FIG. 1 there are nine zones, the present invention is not limited to nine zones, or an odd or even number of zones. In the embodiment depicted, zones are generally three feet long, although they may be of any suitable length, such as six feet. In the embodiment depicted, zone control modules 4c, 6c, 8c and 10c each controls two zones, although a zone control module may control more than two zones or control only one zone, such as control module 12c which controls zone 12a, the discharge zone, which discharges to conveyor 14. The number of zones that a single zone control module may control is not limited by the present invention.

Each zone is selectively driven in any suitable manner as is known in the art, such as for example, the drive arrangement shown in U.S. Pat. No. 6,889,822, the disclosure of which is incorporated herein by reference. The speed of each zone is selectively controlled by being set within a range between and including a maximum speed and a minimum speed. As used herein, minimum speed includes but is not limited to a speed of zero. The zone speeds may be controlled in any suitable manner, such as for example, the variable speed control system of U.S. Pat. No. 5,823,319, the disclosure of which is incorporated herein by reference. That variable speed control system utilizes pulse width modulation control applied to selectively transfer power from a common drive element serving multiple zones of a single accumulation conveyor to rollers of a zone. Pulse width modulation in this case involves driving the zone either at full speed (also referred to as idle speed) or not driving the zone, and controlling the duty cycle (the length of time that the zone is driven at full speed during a predetermined period of time) to produce an effective speed—the average of instantaneous speeds over the duty cycle. For example, a 100% duty cycle results in an effective speed equal to the maximum zone speed (resulting from the maximum speed of the drive element accounting for inefficiencies such as slippage, friction, inertia, etc.), also referred to as the idle speed. A 0% duty cycle results in an effective speed of zero. Zones may be driven by a drive arrangement which is capable of controlling the speed without modulation, producing a constant speed which is the effective speed.

In the embodiment depicted, each zone of accumulation conveyor 2 comprises a plurality of conveyor rollers (diagrammatically illustrated) defining a conveying surface, which may be selectively driven such as by an underlying chain or a drive belt (not shown) urged against the conveyor rollers using pneumatic actuators (not shown). Each control module 4c, 6c, 8c, 10c and 12c is configured to control the pneumatic actuators (not shown) of their associated zones, and is therefore connected to a pneumatic source. The control modules 4c, 6c, 8c, 10c and 12c may be pneumatically daisy chained together. Other drive arrangements include motorized drive rollers, with control modules 4c, 6c, 8c, 10c and 12c configured appropriately therefor.

Each zone 4a, 4b, 6a, 6b, 8a, 8b, 10a, 10b and 12a includes respective sensors 4d, 4e, 6d, 6e, 8d, 8e, 10d, 10e and 12d that are connected to the respective control modules of the zones. In the embodiment depicted, the sensors are photo eyes with respective reflectors, although any suitable sensor may be used, such as roller sensors or diffused scan sensors. The positions and orientations of the sensors, also referred to herein as photo eyes, within the zones are selected based on the system parameters, such as length or type of packages. Although FIG. 1 is a diagrammatic illustration, sensors 4d, 4e, 6d, 6e, 8d, 8e, 10d, 10e and 12d are depicted as proximal the discharge end of each zone, such as about one foot from the discharge. Any suitable location may be used, such as proximal the feed end of each zone.

In the embodiment depicted, control modules 4c, 6c, 8c, 10c and 12c are networked together with controller 16, communicating data to controller 16 indicative of conditions of the plurality of zones 4a, 4b, 6a, 6b, 8a, 8b, 10a, 10b and 12a. Although a daisy chain configuration is depicted, any suitable network may be used. Similarly, although controller 16 is depicted as being a single physical device, a controller in an embodiment of the disclosed technology could be implemented in other ways as well, such as in the form of multiple integrated physical devices, or multiple discrete physical devices which communicate with each other and/or other devices via a network (e.g., a daisy chain network). Controller 16, which comprises at least one processor, comprises at least part of a processing system, which itself may have more than one controller, which executes processor-executable instructions to perform operations to control accumulation conveyor 2. In the embodiment depicted, logic for control of accumulation conveyor 2 is resident on controller 16, which executes instructions that implement the control logic. Each zone 4a, 4b, 6a, 6b, 8a, 8b, 10a, 10b and 12a has a respective settable operating speed that may be set by controller 16. Controller 16 may control more than one accumulation conveyor line. Control modules 4c, 6c, 8c, 10c and 12c are I/O based. In the embodiment depicted, an EtherCAT network is used to provide the high speed communication necessary for controlling the zones. The present invention is not constrained to a certain I/O scheme, networking methodology, architecture or centralized processing. Alternatively, control modules 4c, 6c, 8c, 10c and 12c could be devices with I/O and processing capability, such as a programmable logic control.

In the embodiment depicted, controller 16 executes instructions to implement the control logic of an embodiment of the present invention. The interface, to which controller 16 is coupled, may be as simple as discrete inputs and outputs for flow control devices (e.g., switches, sensors, solenoid valves, etc.) or as advanced as commands from one or more other components in the processing system of the controller, or other processing systems entirely.

Aspects of the technology described herein can provide improved acceleration and deceleration control of articles transported on an accumulation conveyor of a material handling system, thereby allowing the accumulation conveyor to operate at a higher speed with a higher article density while providing gentle handling of articles at the higher speed. For example, the present disclosure could be used to implement a control scheme in which a controller determines a potential speed for each individual zone based on one or more conditions of one or more downstream zones and optionally sets an operating speed based on one or more conditions of one or more upstream zones. As used herein, downstream direction is the direction articles travel on an accumulation conveyor, and upstream direction is the direction opposite of the direction articles travel on an accumulation conveyor. A downstream zone is a zone which is disposed in the downstream direction from another zone. An upstream zone is a zone which is disposed in the upstream direction from another zone. Herein for convenience, these upstream and downstream zones are referred to as a neighborhood. An upstream neighborhood and a downstream neighborhood may extend one or more zones in the particular direction. The operational mode effected by a control scheme such as described is referred to as neighborhood mode. Neighborhood is used herein only as a label referring this type of control scheme, and does not represent a limitation on the scope of the present invention or the claims.

In accordance with an embodiment, a method for controlling an accumulation conveyor having a plurality of zones comprises receiving, at a controller, data indicating conditions for each zone of the plurality of zones, and setting, at the controller, an operating speed for a first zone of the plurality of zones based on a condition selected from the group consisting of a condition of an upstream zone of the plurality of zones and a condition of a downstream zone of the plurality of zones, the condition of the downstream zone being a speed of the downstream zone.

In another embodiment, the method comprises setting the speed for the first zone based on whether the downstream zone is occupied by an article.

In another embodiment, a potential speed of the first zone based on the speed of the downstream zone may be determined. The potential speed may be based on a deceleration rate of the first zone, on a length of the first zone, or a characteristic of an article being moved by the accumulation conveyor.

In another embodiment, the operating speed for the first zone may be set based on a deceleration rate of the first zone, on a length of the first zone, or a characteristic of an article being moved by the accumulation conveyor.

In another embodiment, the operating speed for the first zone may be set equal to the potential speed of the first zone. Whether to do so may be based on the condition of the upstream zone, such as whether there is an article in the upstream zone or whether the speed of the upstream zone is at or above a certain speed.

In another embodiment, the potential speed of the first zone is based on the condition of the upstream zone.

In another embodiment, the operating speed for the first zone may be set equal using a formula which is based on a speed of a downstream zone. The formula may be based on conditions of the local zone.

In another embodiment, setting the operating speed for the first zone may be based on whether the upstream zone is occupied by an article or on whether the speed of the upstream zone is at least a certain speed.

Figure 2:
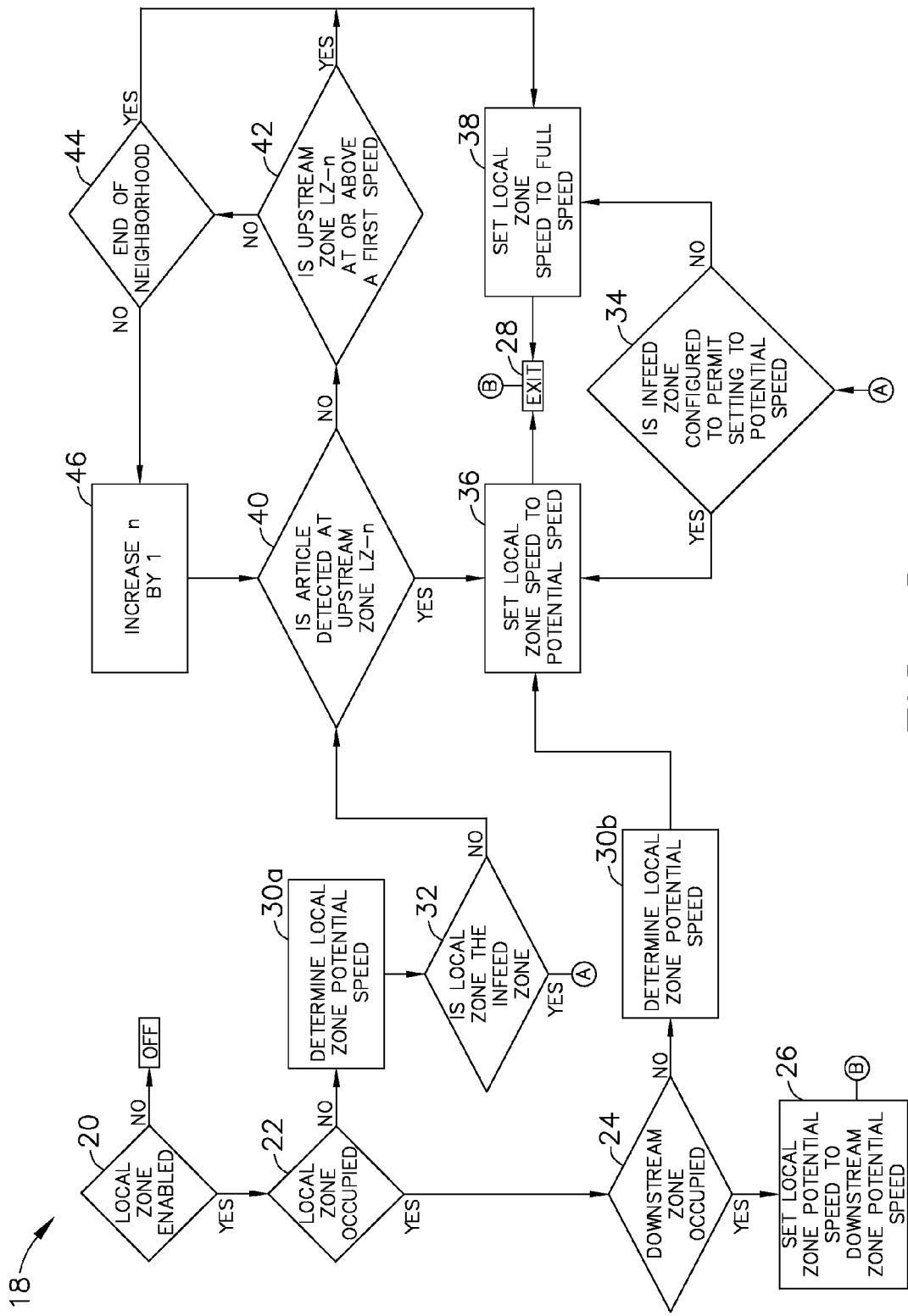
FIG. 2 illustrates a flow diagram of neighborhood zone control functionality logic, according to one embodiment.

Referring to FIG. 2, neighborhood control functionality logic 18 is shown, which may be applied to each zone of a plurality of zones of an accumulation conveyor. It is noted that there is other accumulator control logic which is executed in conjunction with any neighborhood control logic such as the neighborhood control functionality logic 18. The zone being examined is referred to herein as the local zone and may be abbreviated LZ. Control logic 18 examines each of the plurality of zones, beginning with the zone which is furthest downstream of the plurality of zones and progressing upstream, which may be progressing consecutively upstream examining each zone, or which may be progressing sequentially upstream potentially skipping zones but still progressing in the upstream direction. In the embodiment depicted, control logic 18, begins with the discharge zone, which is zone 12a of accumulation conveyor 2 of FIG. 1, and ends with the upstream-most zone of the plurality of zones, which is zone 4a of FIG. 1. At 20, it is determined whether the local zone is enabled (e.g., to be energized). Whether a zone is enabled is determined by rules of the control logic controlling the accumulation modes of the zones of the accumulation conveyor. The neighborhood mode will only apply if the local zone is enabled, and neighborhood mode is turned on.

If the local zone is enabled, control logic 18 proceeds to 22, where it is determined whether the local zone is considered occupied. As used herein, a zone is considered occupied when the sensor of that zone has given a signal indicating detection of an article (e.g., a blocked signal from a photo eye) for a period of time equal to or greater than a first delay period. The first delay period could be, for example, zero, 0.75 seconds, 1.0 seconds or 1.5 seconds. A zone which is considered occupied will be considered not occupied once the sensor is cleared (e.g., a photo eye is not blocked) for a period of time equal to or greater than a second delay period. The second delay period could be equal to or different from the first delay period, and could also be, for example, zero, 0.75 seconds, 1.0 seconds or 1.5 seconds. In one embodiment, once a sensor of a zone has detected an article, the state of that zone is "latched" to occupied until the sensor becomes unblocked and that zone is energized. Latching is configurable by zone, and is used to ensure that the occupied state of a zone does not change unless the article has been released from that zone.

If the local zone is considered occupied, control logic 18 passes to 24, and the zone immediately downstream of the local zone, LZ+1, is examined for whether it is considered occupied. If the downstream zone is considered occupied, then control logic 18 proceeds to 26, and the local zone potential speed is determined to be equal the potential speed (as described below) of the downstream zone speed. Control logic 18 continues to exit 28, and control logic 18 is then reexecuted for the next upstream zone, continuing the execution until all zones of the plurality of zones have been examined.

If the local zone being examined is the discharge zone, there is no downstream zone to consider at 24 or 26. To account for this, a system implementing control logic 18 such as shown in FIG. 2 may be configured with conditions for consideration at 24 and 26, which conditions may be selectively predetermined (e.g., default values) or which may vary based on conditions of other components of the material handling system, such as on the conditions of the conveyor immediately downstream of the discharge zone, which is conveyor 14 in FIG. 1.

If at 22, the local zone is not occupied, then a potential speed for the local zone is determined at 30*a*. At 30*a*, determination of the potential speed may be based, at least in part, on the speed, such as the potential speed, of one or more downstream zones, which may or may not begin immediately downstream of the local zone. The potential speed of the local zone may be based on other attributes of one or more downstream zones. By way of non-limiting example, a formula which may be used to determine the potential speed is given by $$V_{LZ} = (2|D_{LZ}|*L_{LZ}+(V_{LZ+1})^2)^{1/2}$$

where:
$V_{LZ}$ is the potential speed of the local zone
$D_{LZ}$ is the deceleration rate of the local zone
$L_{LZ}$ is the length of the local zone
$V_{LZ+1}$ is the potential speed of the downstream zone, LZ+1

In an embodiment such as that depicted, LZ+1 will be immediately downstream (adjacent) the local zone, although LZ+1 does not have to be adjacent the local zone and may be spaced further downstream of the local zone.

In some embodiments, there may be a configurable minimum speed which represents the lowest speed at which a zone may be practically operated. In such a case, if a determined potential speed of a zone is below the minimum speed for that zone, then the potential speed for that zone may be set to zero or to another, configurable speed. Similarly, there may also be a configurable maximum speed, such that if the determined potential speed exceeds the maximum speed, then the potential speed may be limited by the maximum speed. A way of expressing the above formula subject to a maximum speed is $$V_{LZ} = \min(2|D_{LZ}|*L_{LZ}+(V_{LZ+1})^2)^{1/2}, V_{LZ\,max})$$

where $V_{LZ\,max}$ is the configurable maximum speed for the local zone

The deceleration rate may be stored in a database table, and may initially be based on predetermined default values which may be adjusted based on actual performance. Alternatively, deceleration rate may be set uniquely based on article characteristics, such as determined by type of article or uniquely determined for each individual article, based on known or detected characteristics of such individual article, such as physical properties, such as weight, or through observed performance such as by dynamically tracking the actual motion of articles, which, for example, may be compared to expected motion for the article, whether as expected default motion for the type of article or for the individual article.

After the local zone potential speed is determined at 30*a*, at 32 the logic examines whether the local zone is the infeed zone. If it is the infeed zone, there are no upstream zones to be considered by the logic. For the infeed zone, the accumulation system is configurable, such as based on information stored in a database, to set the settable operating speed of the infeed zone to either full speed or the determined potential speed. At 34, this configuration is examined. If the accumulation system is configured to permit setting the infeed zone operating speed to the determined potential speed, then at 36 the control logic 18 sets the infeed zone (which is, in this case, the local zone being considered) operating speed to the determined potential speed and proceeds to exit 28. If the accumulation system is not so configured, at 38 control logic 18 sets the infeed zone operating speed to full speed and proceeds to exit 28. From exit 28, since in this instance, the uppermost upstream zone has been considered, control logic 18 will begin execution again, with the discharge zone, as may be initiated by the main instruction logic loop controlling accumulation conveyor 2.

The operating speed of the local zone may also be set based on conditions of an upstream zone. In the depicted embodiment, progressing in the upstream direction starting with the zone immediately upstream of the local zone, control logic 18 examines the upstream zones to assess conditions of the upstream zones, determining whether there is an upstream zone at full speed or an upstream zone which has detected an article (e.g., the sensor detects an article). If control logic 18 identifies an upstream zone at or above a first speed, which is full speed in the embodiment depicted, or has examined all of the upstream zones (i.e., reached the end of the neighborhood), the operating speed of the local zone will be set at a second speed, which is full speed in the embodiment depicted. If prior to identifying an upstream zone at or above a first speed (full speed in this embodiment) or reaching the end of the neighborhood, control logic 18 detects an upstream zone whose occupied status is occupied, the operating speed of the local zone will be set to the determined potential speed of the local zone to prepare for the incoming article.

For the embodiment depicted, which utilizes pneumatic pulse width modulation, by considering upstream zone conditions, allowing a zone to not operate at less than full speed until necessary avoids unnecessary cycling of the valve and the wasting of air.

Blocks 40, 42, 44 and 46 illustrate an implementation of considering upstream zone conditions. At 40, starting with the zone immediately upstream of the local zone being examined, control logic 18 examines whether an article is detected at the upstream zone upstream zone, LZ-n. If an article is detected, such as would be the case if the sensor of the upstream zone was blocked, then the local zone operating speed is set to the determined potential speed at 36. If an article is not detected for the upstream zone under consideration, at 42 control logic 18 determines whether the upstream zone is set, in the embodiment depicted, to full speed. If it is, the local zone operating speed is set to full speed (the second speed in the embodiment depicted) at 38. If not, control logic 18 determines at 44 whether all upstream zones in the neighborhood have been considered for the local zone being examined ("end of neighborhood"). If all upstream zones have been not been considered, control logic 18 passes to 46 and then back to 40 to look at the next upstream zone. If the end of the neighborhood is reached at 44 (all upstream zones of the neighborhood) have been considered through the 40, 42, 44, 46 loop), local zone control logic 18 proceeds to set the local zone operating speed to full speed at 38.

If at 24, the downstream zone is considered not occupied, a potential speed for the local zone is determined at 30*b*, and at 36 the control logic 18 sets the local zone operating speed to the determined potential speed and proceeds to exit 28.

Figure 3:
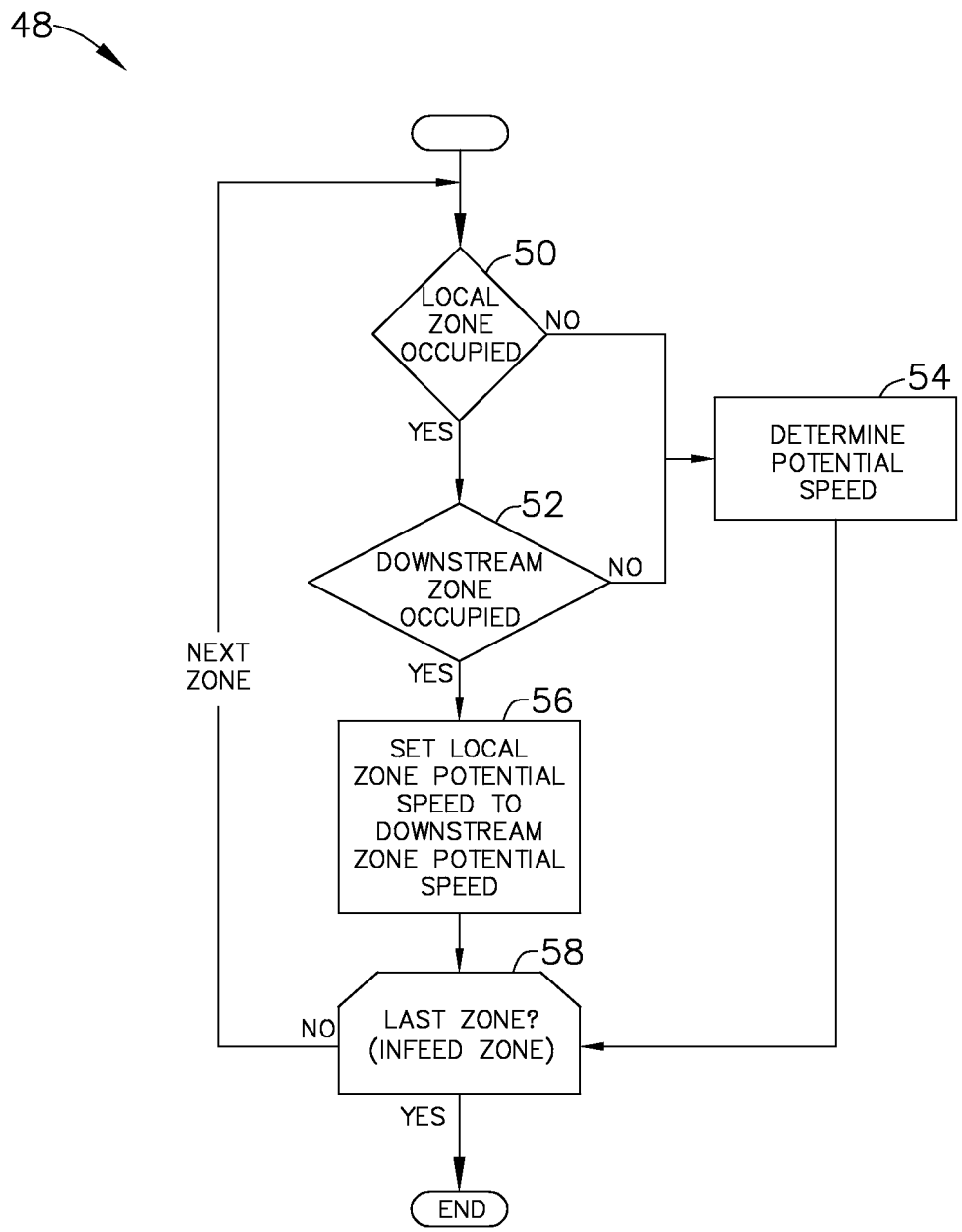
FIG. 3 illustrates a flow diagram of logic for determining potential speed of zones, according to one embodiment.
Figure 4:
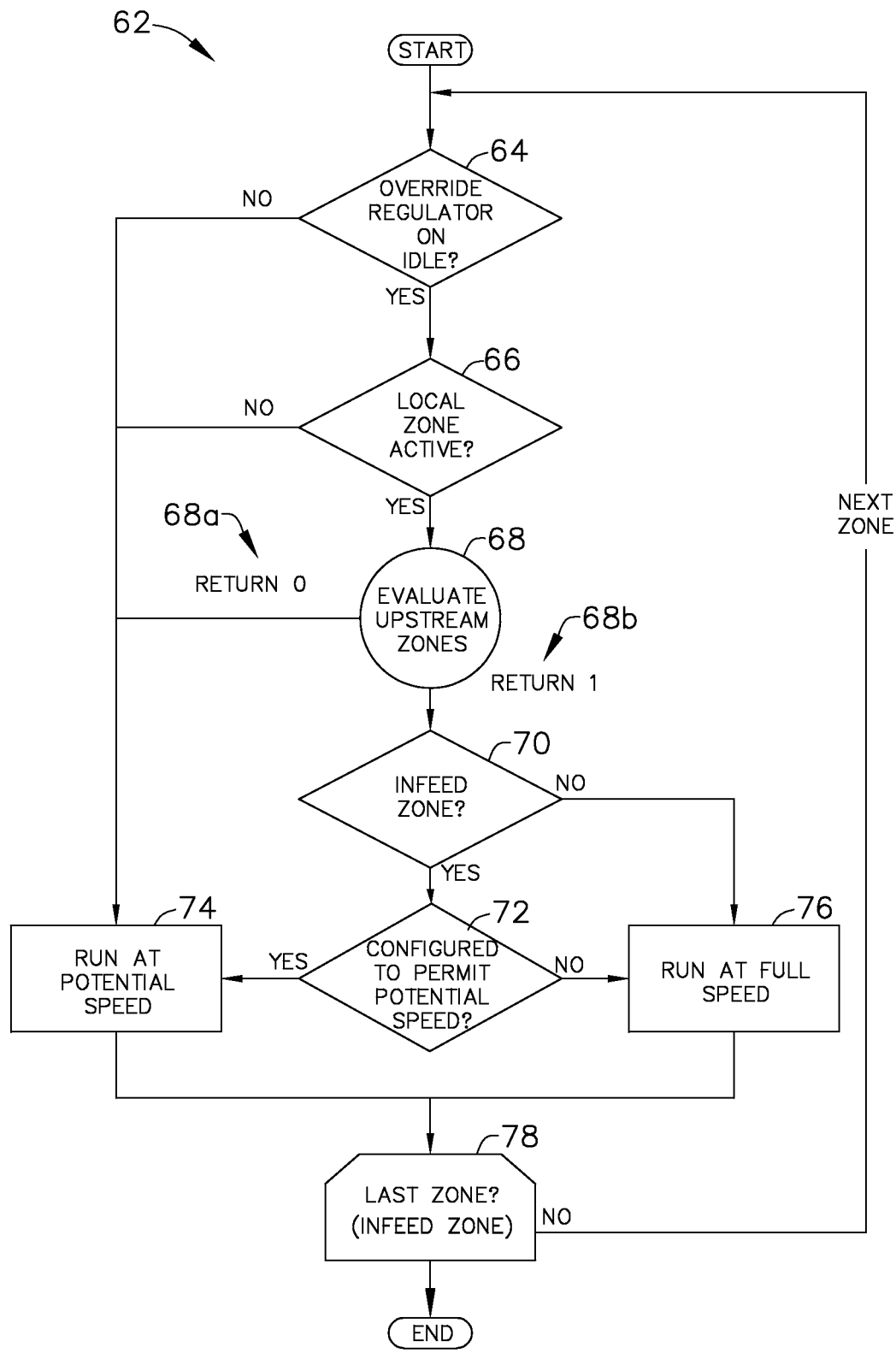
FIG. 4 illustrates a flow diagram of logic for setting the operating speed of zones, according to one embodiment.
Figure 5:
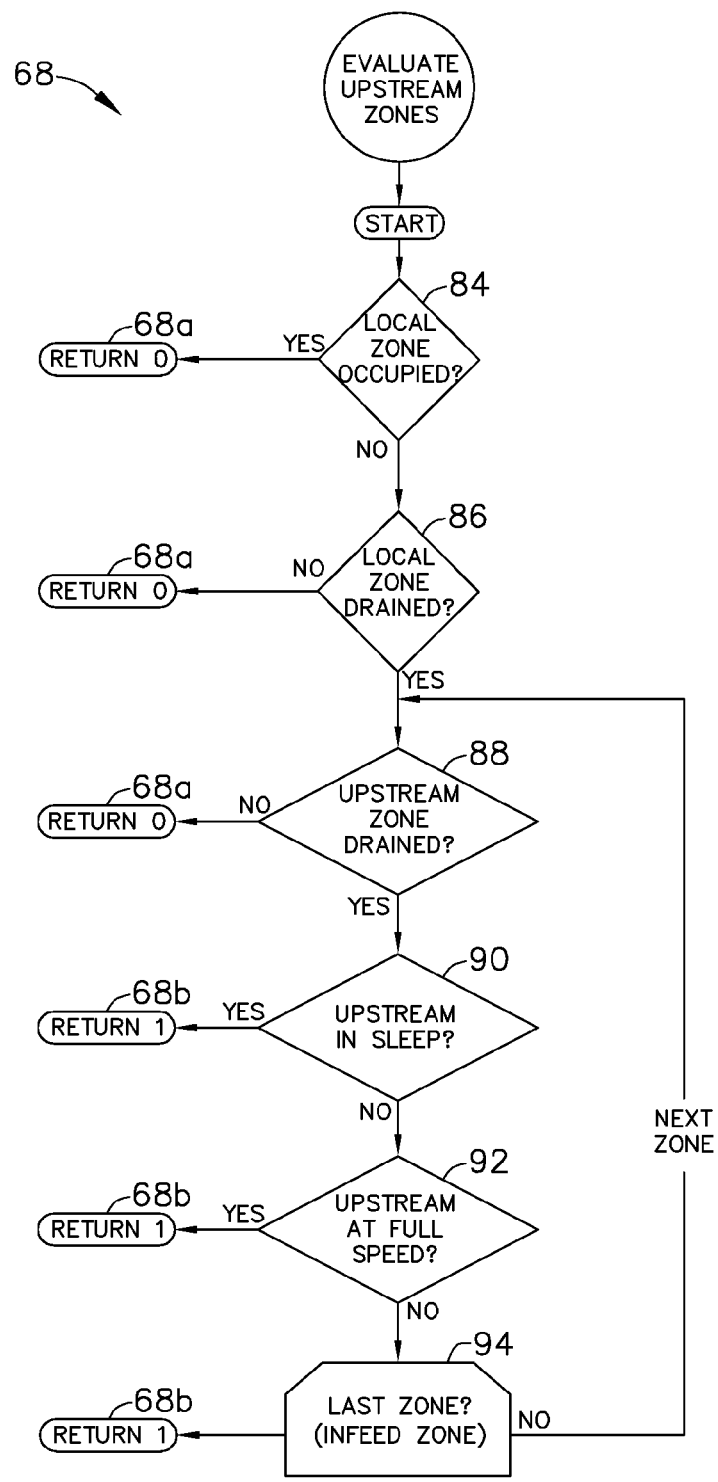
FIG. 5 illustrates a flow diagram of logic for evaluating upstream zones, according to one embodiment.
Figure 6:
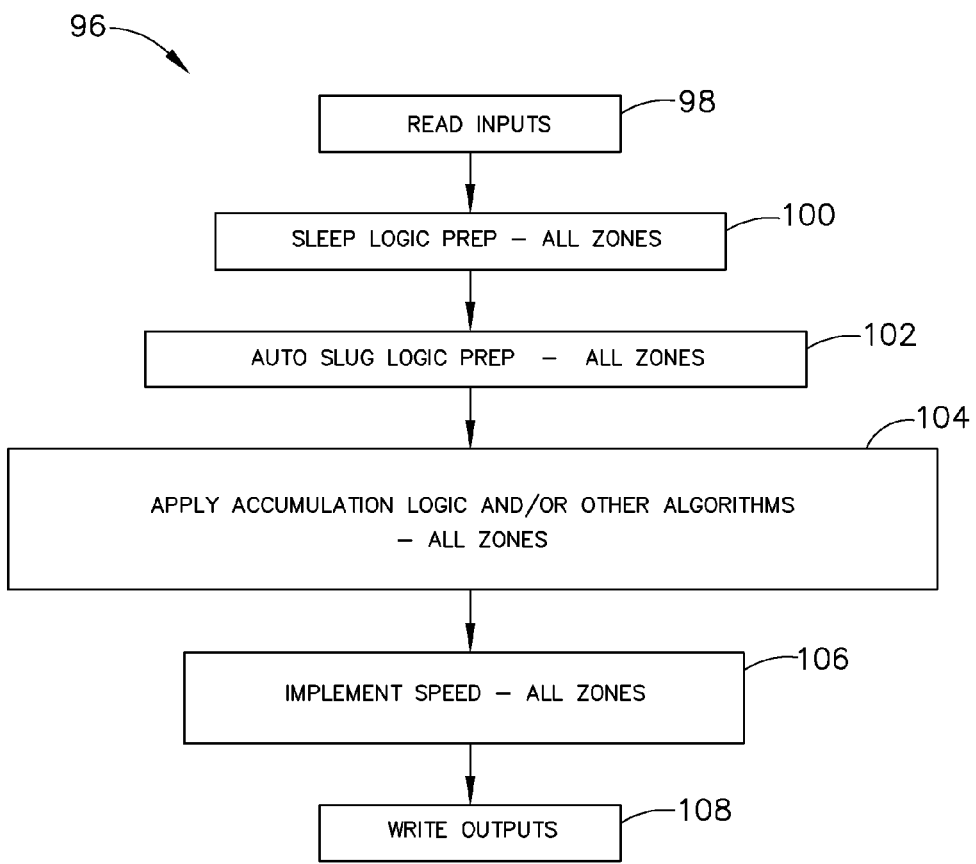
FIG. 6 illustrates a flow diagram of logic for accumulation flow control, according to one embodiment.

FIG. 3 and FIGS. 4 and 5 illustrate logic which could be implemented based on the teachings of this disclosure. FIG. 3 illustrates logic 48 which determines the respective potential speed for each zone of the plurality of zones. Logic 48 is part of the main instruction loop (an embodiment of which is illustrated in FIG. 6) controlling accumulation conveyor 2 and executes for each active zone each time the main instruction loop executes. Logic 48 examines each of the plurality of zones, beginning with the discharge zone first and progressing upstream therefrom. At 50, logic 48 determines whether the local zone is considered occupied. If the local zone is considered occupied, at 52 the downstream zone is examined to determine whether it is considered occupied. When the local zone is the discharge zone, the system may be configured with a virtual zone "located" downstream of the discharge zone with predetermined characteristics or characteristics based on attributes of one or more actual systems of the material handling system.

If the local zone is not considered occupied at 50 or the downstream zone is not considered occupied at 52, a potential speed is determined for the local zone at 54. The potential speed may be, as discussed above, based at least in part on the potential speed for one or more downstream zones, and may be calculated using the formula described above. If the local zone and the downstream zones are considered occupied, then at 56 the potential speed of the local zone is determined to be equal to the potential speed of the immediately downstream zone. In the embodiment shown in FIG. 3, at 58, once all zones have been examined, logic 48 ends, until the next execution of the main instruction loop. As described below, determination of a potential speed may be part of a larger loop executed for each zone.

Logic 48 only determines the speed at which the zones may be operated (subject to whether that speed is actually set and implemented by the control logic), which is referred to as the potential speed—it does not set, nor implement, the determined potential speeds as the operating speed. In the embodiment depicted by FIG. 3, the potential speed is determined based on a condition of the zone which is downstream of the local zone, such as based on a speed of the downstream zone.

FIGS. 4 and 5 illustrate logic for setting the actual respective operating speeds of the zones. Logic 62 is part of the main instruction loop controlling the accumulation conveyor and may, as shown in the embodiment depicted, execute fully each time the main instruction loop executes. Logic 62 examines each of the plurality of zones, progressing upstream beginning with the discharge zone first. At 64 it is determined whether the accumulation system control is configured to override the speed regulator for the local zone being examined when the local zone is idle, i.e., is not occupied and is considered drained. Drained indicates a complete lack of product flow. A local zone is considered drained if its sensor (e.g., photo eye) is clear for a period of time, referred to herein as the drained delay. The drained delay time is reset when the sensor becomes blocked. The drained delay may be set at any suitable length, such as ten seconds. The drained delay may be configurable within a range, such as between zero to thirty seconds. Each zone may have its own unique drain delay.

In the depicted embodiment, the speed regulator functions to effect the effective speed through pulse width modulation. When a zone is idle (i.e., not occupied and drained), there are conditions, such as no upstream articles, when it may be inefficient to regulate the speed of that zone through pulse width modulation. If the system is configured to override the speed regulator when the zone is idle, then, when the zone is idle, the system may, in certain conditions, not implement a potential speed through pulse width modulation, instead operating the zone at full speed. If the system in not configured to permit overriding the speed determined by the speed regulator, then logic 62 sets the speed of the local zone at 74. Such override might be set to no for certain specific circumstances, for example, in order to adjust the system during set up or for tuning the line. It is anticipated that during normal operation, the override would be set to yes.

If at 64, it is determined that the system is configured to override the speed regulator when the local zone is not occupied and is considered drained, logic 62 considers whether the local zone is active at 66. Whether a zone is active is not based on whether the zone is on or off, but based on whether it is enabled. A zone is considered active if logic external to logic 62 determines the zone should be running or moving product. If the local zone is not active, the neighborhood mode is not applied and logic 62 sets the speed of the local zone at 74.

If at 66 the local zone is determined to be active, then control logic 62 examines at 68 the upstream zones of the neighborhood of the local zone. The logic of evaluating upstream zones 68, which is discussed below, returns to logic 62 at return 68*a* or return 68*b*. If returned at return 68*a*, logic 62 sets the operating speed of the local zone to the potential speed at 74.

If returned at 68*b*, logic 62 determines at 70 whether the local zone being examined is the infeed zone. If the local zone is the infeed zone, logic 62 proceeds to 72 where it determines whether the system is configured to permit setting the infeed zone speed to the potential speed. If it is so configured, then at 74 the local zone, i.e., the operating speed of the infeed zone is set at the potential speed. If the system is not configured to permit setting the infeed zone to run at the potential speed, then the infeed zone is set at 76 to run at full speed (as mentioned above, the second speed in the embodiment depicted).

If the local zone is not the infeed zone, logic 62 proceeds from 70 to 76 and sets the operating speed of the local zone to full speed.

Once the operating speed of the local zone has been set either at 74 to the potential speed or at 76 to full speed, logic 62 determines at 78 whether all zones have been examined, and either returns to 64 if there are more zones to be examined, or returns to the main instruction loop.

Referring to FIG. 5, logic 68 starts with the local zone being examined and progresses upstream therefrom until a condition results in a return 68a or return 68b. At 84, it is determined whether the local zone is considered occupied. If it is, then logic 68 returns at return 68a. If the local zone is not considered occupied, logic 68 determines at 86 whether the local zone is considered drained. If the local zone being examined is determined not to be drained at 86, logic 68 returns at return 68a.

From 86, logic 68 begins to examine the neighborhood of the local zone. Logic 68 starts with the zone immediately upstream of the local zone and progresses upstream therefrom until a condition results in a return. At 88, logic 68 determines whether the upstream zone is drained. If it is not, logic 68 returns at 68a. If the upstream zone is drained, then logic 68 determines at 90 whether the upstream zone is in sleep mode. If the upstream zone is in sleep mode, logic 68 returns at return 68b.

Sleep mode is a configurable mode that may be used to temporarily suspend operation of an active zone which is running at full speed and has not detected an article for a period of time, referred to as the sleep time delay. The sleep time delay is the time delay that must expire for a zone before it will enter the sleep mode. Sleep mode includes a configurable optional conveyor running input. An active zone can use the status of its sensor and the sensors of the immediate upstream zone and the second upstream zone to determine the sleep operating state. The zone will enter sleep if all three zone sensors have been clear for a set sleep time delay. The sleep time delay will reset if any of the three zone sensors become blocked.

If it is determined at 90 that the upstream zone is not in sleep mode, then it is determined at 92 whether the upstream zone is at full speed. If it is, then logic 68 returns at 68b. If the upstream zone is not at full speed, logic 68 determines whether there is another upstream zone to consider. If there is then 88, 90, 92, 94 is repeated for the next upstream zone. If all upstream zones have been considered, logic 68 returns at return 68b.

FIG. 6 illustrates logic 96 for accumulation flow control, which may executed as instructions by controller 16 to cause accumulation conveyor to perform the operations described herein. Accumulation flow control for operation of an accumulation conveyor may be accomplished through a wide variety of ways. The process illustrated in FIG. 6 comprises three categories: read inputs 98, solve logic (represented by 100, 102, 104 and 106) and write outputs 108, implementing control.

In FIG. 6, after inputs are read at 98, logic 96 may update values related to sleep mode at 100 then update values related to auto slug mode at 102, neither of which are required for implementing neighborhood zone control. In an embodiment, auto slug may be configurable by zone and allows the so configured zones to participate in a slug release. If the front carton of the slug is commanded to run, and it is known that it will not be stopping in the next zone to accumulate, the entire slug can remain intact (rather than singulating) if the zones that hold the slug all run at the same time—together.

As mentioned, neither 100 nor 102 is necessary for the practice of the present invention. At 104, logic 96 applies the accumulation control logic and other algorithm logic to all zones. Thereafter, at 106, zone operating speeds are set, such as, in the embodiment depicted, by execution of 104 for all zones, and at 108 outputs are written. Each output, also referred to as command, indicating the zone operating speeds, is sent to the respective control module of the zone corresponding the to the zone operating speed.

Figure 7:
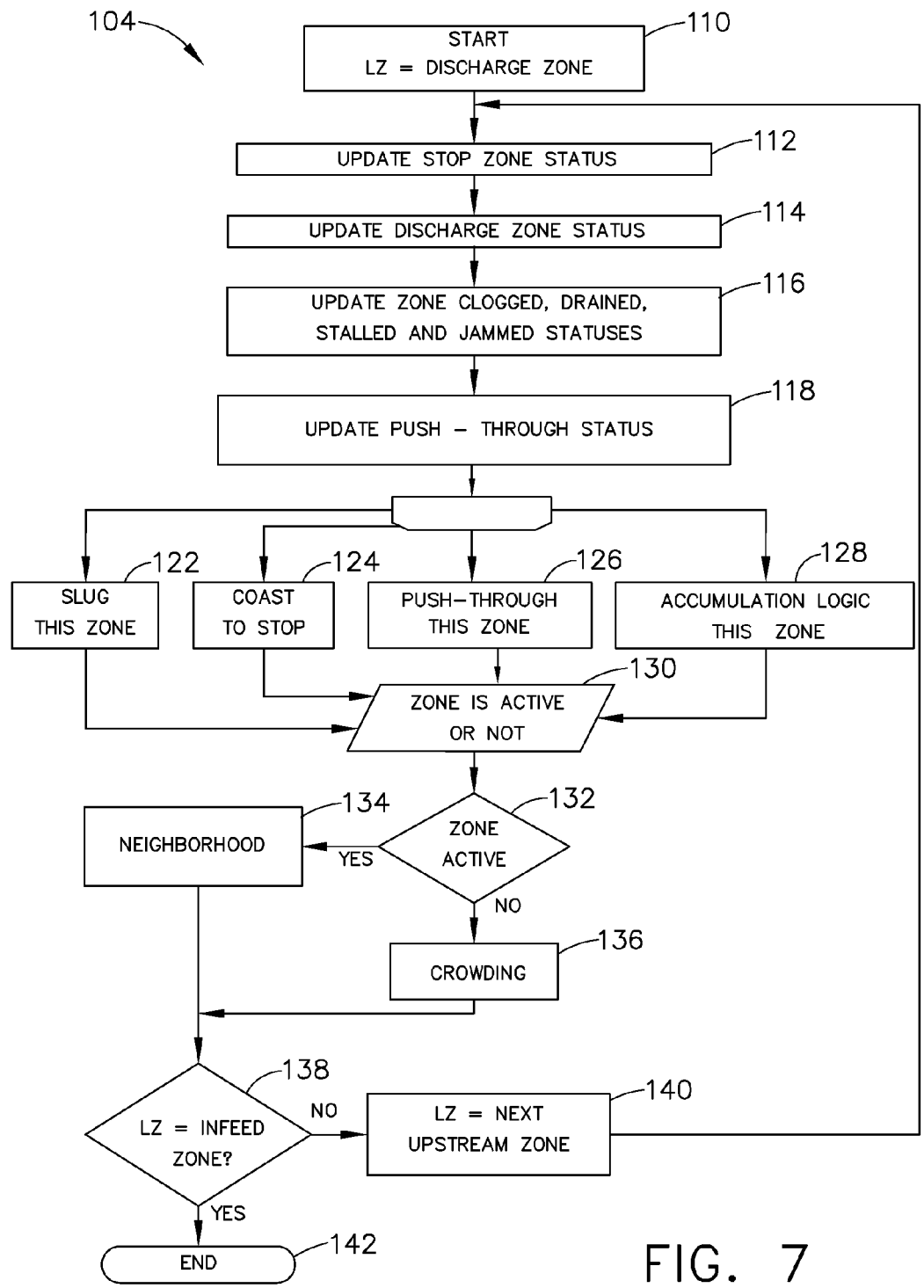
FIG. 7 illustrates a flow diagram of logic for applying accumulation control logic and other algorithms, according to one embodiment.

FIG. 7 illustrates an exemplary implementation of accumulation control logic 104 which may implement neighborhood zone control. It is noted that neighborhood zone control is not limited to combination with the specific implementation illustrated in FIG. 7. Logic 104 starts considering each local zone, one at a time, starting at 110 by setting the local zone as the discharge zone then moving through the remainder of the zones, sequentially in the embodiment depicted, in an upstream manner. In this implementation logic 104 updates the stop zone status of the local zone at 112. Stop zone may be used to set a zone to inactive for the duration of an external command, regardless of the operating state of that zone. At 114, logic 104 updates the discharge zone status, which is applicable only when the local zone being considered is the discharge zone. The discharge zone status is indicative of whether the discharge zone should be releasing.

At 116, logic 104 updates the zone clogged, zone drained, zone stalled and zone jammed statuses of the local zone. The zone clogged status indicates an apparent, or potential, obstruction in a given zone. A local zone status is set to clogged if the local zone sensor is blocked for a set time period, the clogged delay. The clogged delay will reset when the local zone sensor becomes clear. "Jam" and "stall" are control strategies which may be implemented, independent of neighborhood zone control, for conditions when articles are not being transported in a zone as expected. They are local evaluations for each zone. Stall status is the precursor to jam status. The zone stall status indicates that article movement has been impaired or that a zone sensor is misaligned. A local zone status is set to stalled when it is considered clogged and its immediate (first) downstream zone is considered drained. A stall will clear if the local zone sensor becomes clear. The zone jammed status indicates that article transport has essentially stopped due to a stall condition. A local zone status is set to jam when it is considered stalled and the immediate (first) upstream zone and the (second) upstream zone statuses have been set to clogged.

At 118, control logic updates the push-through status of the local zone being considered—whether the local zone needs to perform push-through. Push-through occurs when the local zone status is set to stall. Push-through logic couples the local zone operating state (active/inactive) to the immediate upstream zone(s), in an attempt to push articles through the stall. Push-through will cease if the stall is cleared. Push-through is disabled if a jam condition is determined to exist.

Based on the updated status of the local zone being considered by logic 104, the operational mode of the local zone will be set at one of 122 slug mode for the zone, 124 coast to stop or drop to gravity mode for the local zone, 126 push-through mode for the local zone or 128 accumulation mode for the local zone. If the local zone is to perform in the slug mode, the local zone will be active. If the local zone is to perform in the drop to gravity mode, the local zone will be inactive. If the local zone is to perform in the push-through mode, the local zone will be active or inactive for a period of time. If the local zone is to perform in the accumulation mode, the local zone will be active or inactive.

With the setting of performance modes at 122, 124, 126 or 128, logic 104 "knows" at 130 whether the zone is active or inactive. If at 132, the local zone is active, control will pass to the neighborhood zone control at 134. At 134, logic 48 (see FIG. 3) may be implemented, or other implementations of neighborhood zone control may be implemented, for example logic 62 following logic 48. Implementation of logic 48 at 134 would be done one zone for each loop of logic 104, omitting execution of the operation at 58 of logic 48. Similarly implementation of logic 62 at 134 would omit execution of the operation at 78 of logic 62.

If at 132, the local zone is not active, control will pass to the crowding algorithm at 136. Crowding is a local control strategy that attempts to minimize article gap on an accumulated local zone by pulsing the local zone between active and inactive. It begins when a local zone is considered accumulated for period of time and the immediate (first) downstream zone is either considered crowded or is not configured for crowding. A local zone not configured for crowding will always report its status as crowded to the immediate (first) upstream zone. A discharge zone cannot be configured for crowding but will always report its status as crowded.

Following 134 or 136, control passes to 138 where it is determined whether the local zone is the infeed zone. If not, then control passes to 140 where the local zone is set to the next upstream zone, and logic 104 loops back to 112. If logic 104 has considered all of the zones, then at 138 the local zone being considered is the infeed zone and control passes to 142, returning to 106 of logic 96. At 106, the zone operating speeds are set through execution of the logic such as logic 62 of FIG. 4.

Figure 8:
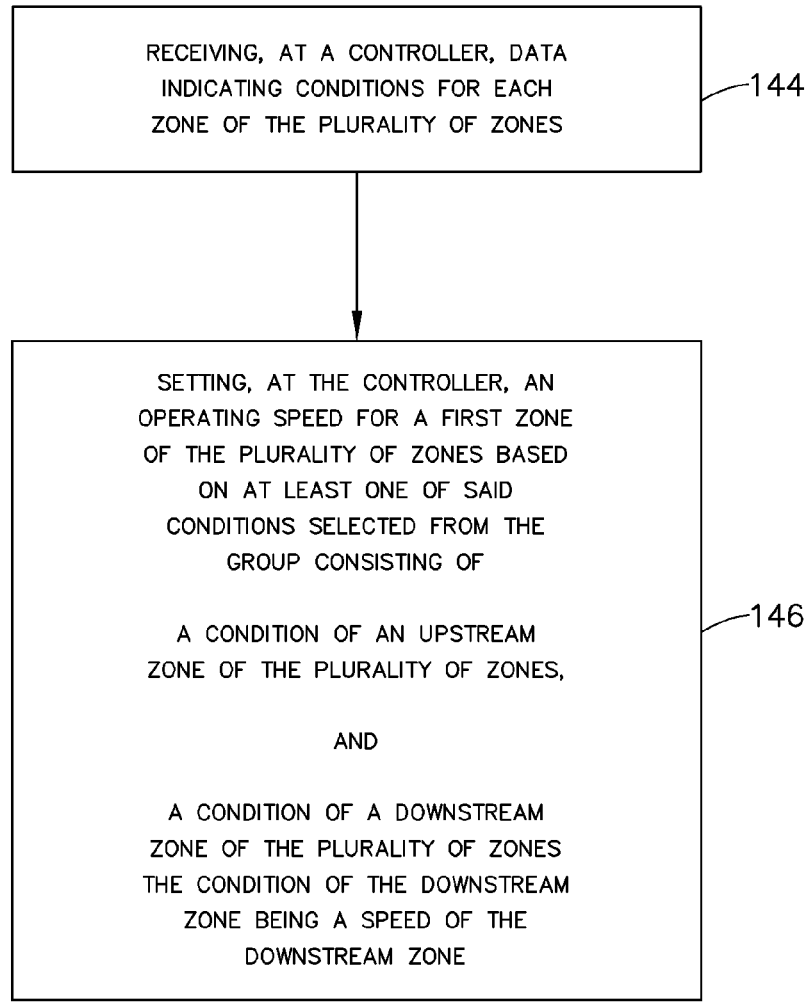
FIG. 8 illustrates a flow diagram of a method for controlling an accumulation, according to one embodiment.

FIG. 8 is a flow diagram of an embodiment of one method for controlling an accumulation conveyor utilizing the present disclosure. At 144, the method comprises receiving, at a controller, data indicating conditions for each zone of the plurality of zones. At 146, the method comprises setting, at the controller, an operating speed for a first zone of the plurality of zones based on at least one of said conditions selected from the group consisting of a condition of an upstream zone of the plurality of zones, and a condition of a downstream zone of the plurality of zones, the condition of the downstream zone being a speed of the downstream zone.

Another example of one or more conditions of downstream zones on which determination of at what speed to set a local zone can be based is the state of the neighborhood zones, such as whether the neighborhood zones are energized. The logic could consider how many of a predetermined number of downstream zones are actively running or enabled to run, and set the speed of the local zone based on that information. For example, the speed could be a percentage of full speed based on the number of downstream neighborhood zones that are energized. This could be the number of sequential downstream zones that are active. By way of non-limiting illustration, if the predetermined number of downstream zones is set to four, and three consecutive zones of these four zones are energized or are enabled to run the local zone could be set to ¾ of the full speed.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute processor-executable instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

EXPLICIT DEFINITIONS

"Based on" means that something is determined at least in part by the thing that it is indicated as being "based on." When something is completely determined by a thing, it will be described as being "based exclusively on" the thing.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:

1. A method for controlling an accumulation conveyor, the accumulation conveyor comprising a plurality of zones, the method comprising:
   receiving, at a controller, data indicating conditions for each zone of the plurality of zones; and
   setting, at the controller, an operating speed for a first zone of the plurality of zones based on at least a condition of a downstream zone of the plurality of zones, the condition of the downstream zone being a speed of the downstream zone, wherein setting the operating speed comprises determining, at the controller, a potential speed of the first zone based on the speed of the downstream zone.

2. The method of claim 1, wherein setting the operating speed for the first zone based on the condition of the downstream zone comprises setting, at the controller, the operating speed for the first zone based on determining, at the controller, whether the downstream zone is occupied by an article.

3. The method of claim 1, wherein the speed of the downstream zone comprises a potential speed of the downstream zone.

4. The method of claim 1, wherein setting the operating speed for the first zone based on the condition of the downstream zone comprises setting, at the controller, the operating speed for the first zone equal to the potential speed of the first zone.

5. The method of claim 4, wherein setting the operating speed for the first zone equal to the potential speed of the first zone is based on a condition of an upstream zone.

6. The method of claim 1, wherein setting the operating speed for the first zone based on the condition of the downstream zone comprises setting, at the controller, the operating speed for the first zone based on a deceleration rate of the first zone.

7. The method of claim 1, wherein setting the operating speed for the first zone based on the condition of the downstream zone comprises setting, at the controller, the operating speed of the first zone based on a length of the first zone.

8. The method of claim 1, wherein setting the operating speed for the first zone based on the condition of the downstream zone comprises setting, at the controller, the operating speed for the first zone based on a characteristic of an article being moved by the accumulation conveyor.

9. The method of claim 1, wherein setting the operating speed for the first zone based on the condition of the downstream zone comprises setting, at the controller, the operating speed for the first zone equal to $$(2|D_{LZ}|*L_{LZ}+(V_{LZ+1})^2)^{1/2}$$

where $D_{LZ}$ is a deceleration rate of the first zone, $L_{LZ}$ is a length of the first zone, $V_{LZ+1}$ is the speed of the downstream zone.

10. The method of claim 9, wherein the operating speed for the first zone is limited by a maximum speed for the first zone.

11. A material handling system, comprising:
   an accumulation conveyor comprising a plurality of zones; and
   a controller in communication with the accumulation conveyor to perform operations to:
      receive data indicating conditions for each zone of the plurality of zones, and
      set an operating speed for a first zone of the plurality of zones based on at least a condition of a downstream zone of the plurality of zones, the condition of the downstream zone being a speed of the downstream zone, wherein to set the operating speed comprises the controller to perform operations to determine a potential speed of the first zone based on the speed of the downstream zone.

12. The material handling system of claim 11, wherein to set the operating speed for the first zone based on the condition of the downstream zone further comprises the controller to perform operations to set the operating speed for the first zone equal to the potential speed of the first zone.

13. The material handling system of claim 11, wherein to set the operating speed for the first zone based on the condition of the downstream zone further comprises the controller to perform operations to set the operating speed for the first zone based on a deceleration rate of the first zone.

14. The material handling system of claim 11, wherein to set the operating speed for the first zone based on the condition of the downstream zone further comprises the controller to perform operations to set the operating speed for the first zone based on a length of the first zone.

15. The material handling system of claim 11, wherein to set the operating speed for the first zone based on the condition of the downstream zone further comprises the controller to perform operations to set the operating speed for the first zone based on a characteristic of an article being moved by the accumulation conveyor.

16. The material handling system of claim 11, wherein to set the operating speed for the first zone based on the condition of the downstream zone further comprises the controller to perform operations to set the operating speed for the first zone equal to the potential speed based on a condition of an upstream zone.

17. The material handling system of claim 11, wherein to set the operating speed for the first zone equal based on the condition of the downstream zone further comprises the controller to perform operations to set the operating speed for the first zone equal to $$(2|D_{LZ}|*L_{LZ}+(V_{LZ+1})^2)^{1/2}$$

where $D_{LZ}$ is a deceleration rate of the first zone, $L_{LZ}$ is a length of the first zone, $V_{LZ+1}$ is the speed of the downstream zone.

18. A controller comprising:
an interface to an accumulation conveyor;
at least one processor; and
a memory,
wherein the at least one processor is coupled to the memory and the interface and configured with processor-executable instructions to perform operations to:
receive data indicating conditions for each zone of the plurality of zones, and
set an operating speed for a first zone of the plurality of zones based on at least a condition of a downstream zone of the plurality of zones, the condition of the downstream zone being a speed of the downstream zone, wherein to set the operating speed comprises said at least one processor configured with processor-executable instructions to determine a potential speed of the first zone based on the speed of the downstream zone.

19. The controller of claim 18, wherein the processor-executable instructions to perform operations to set the operating speed for the first zone based on the condition of the downstream zone further comprises said at least one processor configured with processor-executable instructions to set the operating speed for the first zone equal to the potential speed of the first zone.

20. The controller of claim 18, wherein the processor-executable instructions to perform operations to set the operating speed of the first zone based on the speed of the downstream zone further comprises said at least one processor configured with processor-executable instructions to set the operating speed for the first zone based on a deceleration rate of the first zone.

21. The controller of claim 18, wherein the processor-executable instructions to perform operations to set the operating speed of the first zone based on the speed of the downstream zone further comprises said at least one processor configured with processor-executable instructions to set the operating speed for the first zone based on a length of the first zone.

22. The controller of claim 18, wherein the processor-executable instructions to perform operations to set the operating speed for the first zone based on the condition of the downstream zone further comprises said at least one processor configured with processor-executable instructions to set the operating speed for the first zone based on a characteristic of an article being moved by the accumulation conveyor.

23. The controller of claim 18, wherein the processor-executable instructions to perform operations to set the operating speed for the first zone based on the condition of the downstream zone further comprises said at least one processor configured with processor-executable instructions zone, and based on the condition of the upstream zone, to set the operating speed for the first zone equal to the potential speed based on the condition of the upstream zone.

24. The controller of claim 18, wherein the processor-executable instructions to perform operations to set the operating speed for the first zone based on the condition of the downstream zone further comprises said at least one processor configured with processor-executable instructions to set the operating speed for the first zone equal to $$(2|D_{LZ}|*L_{LZ}+(V_{LZ+1})^2)^{1/2}$$

where $D_{LZ}$ is a deceleration rate of the first zone, $L_{LZ}$ is a length of the first zone, $V_{LZ+1}$ is the speed of the downstream zone.

* * * * *